United States Patent Office 2,791,534
Patented May 7, 1957

2,791,534
COSMETIC PREPARATIONS

Fritz Schaaf, Basel, and Franz Gross, Bottmingen, Switzerland, assignors to Ciba Limited, Basel, Switzerland, a Swiss firm No Drawing. Application December 11, 1953,
Serial No. 397,784

Claims priority, application Switzerland
December 18, 1952

8 Claims. (Cl. 167—90)

This invention provides new cosmetic preparations useful for the treatment and care of the skin. The novel preparations comprise pregnenolone ($\Delta^{5:6}$-3-hydroxy-20-oxo-pregnene) and/or a derivative thereof, such as an ester or ether thereof, in admixture with a cosmetic base. In the preferred composition, the cosmetic preparation contains from about 0.1 to 1.0% of pregnenolone or its derivatives.

We have found that pregnenolone and its derivatives stimulate the growth of the epidermis, and lead to an increase in the layers of epidermis cells and to cell proliferation accompanied by enlargement of the nuclei and cytoplasm, and that these compounds are of advantage for use as agents for the care of the skin.

In preparing the new skin preparations, a cosmetic base, e. g., the ingredients customarily used in skin preparations are mixed with pregnenolone and/or a derivative thereof. The preparations can be made up as cream-like or liquid emulsions. It has been found especially advantageous to add one or more of the following substances: aliphatic hydrocarbons, such as yellow or white petroleum jelly, triglycerides such, for example, as hog fat, cocoa butter, almond oil, saturated or unsaturated higher fatty acids such as myristic acid, undecylenic acid, oleic acid or esters thereof, Peru balsam, chlorophyll and especially esters or ethers of benzyl alcohol such as the benzyl ester of lauric acid, oleic acid or cinnamic acid, dibenzyl or pregnenolone-benzyl ether, and principally the benzyl ester of benzoic acid or of $\alpha$-naphthoic acid. These additions increase the action of the pregnenolone or derivative thereof, that is to say, in order to obtain the same effect a substantially smaller quantity of pregnenolone or a derivative thereof can be used. Furthermore, it is of advantage to add substances which stimulate the circulation of the skin, such as nicotinic acid amide.

The following examples illustrate the invention, the parts being by weight:

Example 1

The following substances are melted together on a water bath:

0.5 part of pure pregnenolone,
20.0 parts of stearic acid,
2.5 parts of almond oil, preserved,
0.8 part of cetyl alcohol, and
0.2 part of para-hydroxybenzoic acid methyl ester, and the melt is heated until it has become clear and has reached a temperature of 80° C. There are also mixed together 1.8 parts of triethanolamine,
5.0 parts of glycerine and
69.2 parts of distilled water and the mixture is heated to 80° C. The strained melt having a temperature of 80° C. is emulsified with the filtered aqueous solution having a temperature of 80° C., and the mixture is stirred until cold. At 40° C. there is added the necessary mixture of perfume oils. The mixture is then further stirred until it has cooled to 25° C. There is obtained a matt skin cream.

Example 2

The following substances are melted together on the water bath:

0.1 part of pure pregnenolone,
10.0 parts of stearic acid,
10.0 parts of myristic acid,
2.5 parts of benzyl benzoate,
0.8 part of cetyl alcohol, and
0.2 part of para-hydroxybenzoic acid methyl ester, and the melt is heated until it has become clear and reached a temperature of 80° C. There are also mixed together 1.8 parts of triethanolamine,
5.0 parts of glycerine,
69.6 parts of distilled water and the mixture is heated to 80° C. The strained melt having a temperature of 80° C. is emulsified with the filtered aqueous solution having a temperature of 80° C., and the mixture is stirred until cold. At 40° C. the necessary mixture of perfume oils is added. The mixture is then further stirred until it has cooled to 25° C. There is obtained a preparation which can be used as a matt skin cream.

Example 3

The following ingredients are melted together on the water bath:

0.2 part of pure pregnenolone,
10.0 part of bleached beeswax,
10.0 parts of hydrogenated ground nut oil,
5.0 parts of benzyl laurate,
5.0 parts of spermaceti,
35.0 parts of almond oil, preserved,
2.5 parts of lanoline,
1.7 parts of sorbitan sesquioleate and
0.8 part of cholesterin and the melt is heated until it has become clear and reached a temperature of 80° C. There are also mixed together 3.0 parts of glycerine
0.2 part of magnesium sulfate
0.6 part of borax, and
26.0 parts of distilled water and the mixture is heated to 80° C. The strained melt at 80° C. is emulsified with the filtered aqueous solution having a temperature of 80° C., and the mixture is stirred until cold. At 40° C. there is added the necessary mixture of perfume oils. The mixture is then further stirred until it has cooled to 25° C. There is obtained a fattening skin cream.

Example 4

The following substances are melted together on a water bath:

0.2 part of pure pregnenolone,
6.0 parts of stearic acid,
2.0 parts of $\alpha$-naphthoic acid benzyl ester,
0.3 part of cetyl alcohol,
0.3 part of sorbitan mono-oleate,
1.5 parts of polyalkylene oxide-sorbitan mono-stearate and
0.2 part of para-hydroxybenzoic acid methyl ester, and the melt is heated until it has become clear and reached a temperature of 80° C. There are also mixed together 2.3 parts of triethanolamine oleate, 3.0 parts of glycerine and
84.2 parts of distilled water, and the mixture is heated to 90° C. After filtration at 88° C. it is emulsified with the strained melt at 80° C., and the mixture is brought to 40° C. with intensive mixing. The necessary quantity of a mixture of perfume oils is added and the whole is thoroughly mixed while cooling to 25° C. There is obtained a face milk of medium viscosity.

*Example 5*

The following substances are melted together on a water bath:

0.5 part of pregnenolone benzyl ether,
20.0 parts of stearic acid,
2.5 parts of sesame oil, preserved,
0.8 part of cetyl alcohol, and
0.2 part of para-hydroxybenzoic acid methyl ester, and the melt is heated until it has become clear and reached a temperature of 80° C. There are also mixed together 1.8 parts of triethanolamine,
5.0 parts of glycerine and
69.2 parts of distilled water, and the mixture is heated to 80° C. The strained melt at 80° C. is emulsified with the filtered aqueous solution having a temperature of 80° C., and the mixture is stirred until cold. At 40° C. there is added the necessary mixture of perfume oils. The mixture is then further stirred until it has cooled to 25° C. There is obtained a matt skin cream.

*Example 6*

The following substances are melted together on a water bath:

0.5 part of pregnenolone acetate,
10.0 parts of bleached beeswax,
10.0 parts of hydrogenated ground nut oil,
5.0 parts of spermacetic,
40.0 parts of almond oil, preserved,
2.5 parts of lanoline,
1.7 parts of sorbitan sesquioleate,
0.8 part of cholesterin, and the melt is heated until it has become clear and reached a temperature of 80° C. There are also mixed together 3.0 parts of glycerine,
0.2 part of magnesium sulfate and
0.6 part of borax, and
25.7 parts of distilled water, and the mixture is heated to 80° C. The strained melt at 80° C. is emulsified with the filtered aqueous solution having a temperature of 80° C., and the whole is stirred until cold. At 40° C. there is added the necessary mixture of perfume oils. The mixture is then further stirred until it has cooled to 25° C. whereupon there is obtained a skin cream.

*Example 7*

The following substances are melted together on a water bath:

0.5 part of pure pregnenolone,
10.0 parts of bleached beeswax,
10.0 parts of hydrogenated ground nut oil,
5.0 parts of spermacetic,
40.0 parts of almond oil, preserved,
2.5 parts of lanoline,
1.7 parts of sorbitan sesquioleate
0.8 part of cholesterin, and the melt is heated until it has become clear and reached a temperature of 80° C. There are also mixed together:

3.0 parts of glycerine
0.2 part of magnesium sulfate
0.6 part of borax
1.0 part of nicotinic acid amide solution of 1% strength in water
24.7 parts of distilled water, and the mixture is heated to 80° C. The strained melt at 80° C. is emulsified with the filtered aqueous solution having a temperature of 80° C., and the mixture is stirred until cold. At 40° C. there is added the necessary mixture of perfume oils. The mixture is then further stirred until it has cooled to 25° C., whereupon there is obtained a skin cream.

What is claimed is:

1. An emulsified preparation for the skin comprising from about 0.1 to about 1.0% of a member of the group consisting of pregnenolone, its benzyl ether and its esters with lower aliphatic carboxylic acids in admixture with a non-toxic absorbable cosmetic emulsion base.

2. An emulsified preparation for the skin as claimed in claim 1 which includes a member of the group consisting of esters and ethers of benzyl alcohol.

3. An emulsified preparation for the skin as claimed in claim 1 which includes dibenzyl ether.

4. An emulsified preparation for the skin as claimed in claim 1 which includes nicotinic acid amide.

5. An emulsified preparation for the skin comprising from about 0.1 to about 1.0% pregnenolone and nicotinic acid amide in admixture with a nontoxic absorbable cosmetic emulsion base.

6. An emulsified preparation for the skin which comprises from about 0.1 to about 1.0% pregnenolone and the benzyl ester of benzoic acid in admixture with a non-toxic absorbable cosmetic emulsion base.

7. An emulsified preparation for the skin which comprises from about 0.1 to about 1.0% pregnenolone and the benzyl ester of α-naphthoic acid in admixture with a non-toxic absorbable cosmetic emulsion base.

8. An emulsified preparation for the skin comprising from about 0.2 to about 0.5% of a member of the group consisting of pregnenolone, its benzyl ether and its esters with lower aliphatic carboxylic acids in admixture with a non-toxic absorbable cosmetic emulsion base.

References Cited in the file of this patent

UNITED STATES PATENTS 2,437,561   Schaaf _____ Mar. 9, 1948

OTHER REFERENCES

Janistyn: Kosmetisches Praktikum, II. Teil, Band B (1941), pp. 255 to 257.

Extra Pharmacopoeia, vol. 1, 23rd. (1952), p. 757.

Friedman: The Story of Scabies, vol. 1 (1947), pp. 430–434.

Brugsch: Biological Abstracts, vol. 26, No. 11, November 1952, p. 2759.